United States Patent
Maiocchi

[11] Patent Number: 5,844,388
[45] Date of Patent: Dec. 1, 1998

[54] DRIVE SYSTEMS FOR A BRUSHLESS MOTOR EMPLOYING PREDEFINED DRIVING PROFILES STORED IN A NONVOLATILE MEMORY

[75] Inventor: Giuseppe Maiocchi, Villa Gaurdia, Italy

[73] Assignee: SGS-Thomson Microelectronics S.r.l., Agrate Brianza, Italy

[21] Appl. No.: 828,167

[22] Filed: Mar. 18, 1997

[30] Foreign Application Priority Data

Mar. 29, 1996 [EP] European Pat. Off. .............. 96830180

[51] Int. Cl.⁶ ....................................................... H02P 6/10
[52] U.S. Cl. .......................... 318/439; 318/254; 318/432; 318/721; 318/724; 388/904
[58] Field of Search ..................... 318/138, 254, 318/432, 433, 439, 685, 696, 700, 701, 720, 721, 722, 724; 388/904

[56] References Cited

U.S. PATENT DOCUMENTS

| | | | |
|---|---|---|---|
| 4,525,657 | 6/1985 | Nakase et al. ........................... | 318/254 |
| 4,868,477 | 9/1989 | Anderson et al. ....................... | 318/696 |
| 5,223,775 | 6/1993 | Mongeau ................................ | 318/432 |
| 5,272,424 | 12/1993 | Lee ......................................... | 318/560 |
| 5,444,341 | 8/1995 | Kneifel, II et al. ...................... | 318/432 |
| 5,469,215 | 11/1995 | Nashiki ................................... | 318/432 |

FOREIGN PATENT DOCUMENTS

| | | |
|---|---|---|
| 0 086 650 A3 | 8/1983 | European Pat. Off. . |
| 0 121 144 A1 | 10/1984 | European Pat. Off. . |
| 0 324 396 A3 | 7/1989 | European Pat. Off. . |
| 0 429 412 A2 | 5/1991 | European Pat. Off. . |

*Primary Examiner*—Bentsu Ro
*Attorney, Agent, or Firm*—Allen, Dyer, Doppelt, Milbrath & Gilchrist, P.A.

[57] ABSTRACT

The torque characteristic of an electrically driven brushless motor may be optimized by driving the phase windings of the motor with predefined, digitized and stored current or voltage profiles. Appropriate sequences of digital samples of the predefined driving profile are sequentially read from a nonvolatile memory where they are permanently stored to drive, through a DAC, the relative winding of the motor in synchronism with a signal representative of the rotor position.

21 Claims, 9 Drawing Sheets

SYNCRONIZING CIRCUIT BLOCK SCHEMATIC

TORQUE CURVES AVAILABLE FOR A MOTOR CURRENT FORM SHOWN IN FIG. 3

FIG. 4B. (PRIOR ART)

MAXIMUM TORQUE AVAILABLE IF PHASES COMMUTATE AT OPTIMUM POINTS T1-T6

SCHEMATIC OF THE LOGIC BLOCK (LB)

END OF SEQUENCE ANTICIPATES ZC INDEX SIGNAL

FIG. 8A.

ZC INDEX SIGNAL ANTICIPATES END OF SEQUENCE

IMOTOR WHEN THE CONTROL SWITCHES FROM START UP
ROUTINE TO THE SYSTEM

DRIVE SYSTEMS FOR A BRUSHLESS MOTOR EMPLOYING PREDEFINED DRIVING PROFILES STORED IN A NONVOLATILE MEMORY

FIELD OF THE INVENTION

The present invention relates to techniques for driving an electronically switched DC motor, commonly referred to as "brushless".

BACKGROUND OF THE INVENTION

Electronically switched DC motors are used in many control and regulation applications. Switched DC motors are also used in mass memory drive systems for rotating media, such as hard disks, floppy disks, optical disks, and CD-ROMs, as well as for linear media, such as tape streamers and the like. Commonly these motors are polyphase motors in a "star" configuration. It is quite common for such a motor to have three phase windings connected in a star configuration and defining six different switching phases and P number of poles. In this case, there will be a number 3*P equilibrium points in a complete revolution of the rotor.

SUMMARY OF THE INVENTION

Figure 1:
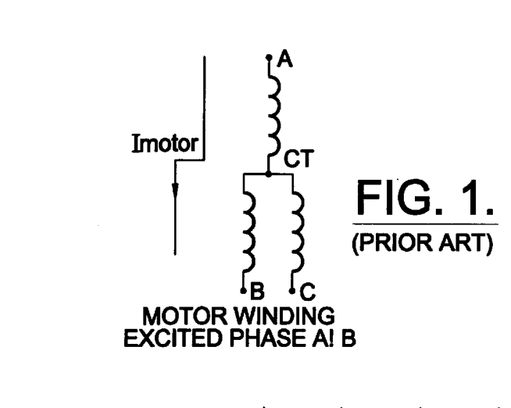
FIG. 1 shows the meaning of the notation used in the present context as in the prior art.

In the present explanation, each excitation phase will be indicated according to a standard rotation by two capital letters. The first capital letter (for example, A, B or C) defines the winding through which the current conventionally flows from the respective supply terminal towards the star center (CT). The second capital letter, preceded by the sign (!), designates the winding through which the current, conventionally coming from the star center, flows toward the supply terminal of the relative winding. For instance, the scheme of the excitation phase A!B is shown in FIG. 1.

These brushless motors are commonly driven using an integrated circuit whose output stage is represented by a polyphase full-wave bridge circuit. In the case of a three-phase motor the bridge circuit may employ six bipolar (BJT) or field effect transistors (MOS) power transistors. The motor current is linearly controlled through a transconductance loop.

During a certain switching phase of the motor, the "sourcing" power transistor is forced into full conduction that is to saturation in case of an MOS device. In contrast, the "sinking" power transistor operates as an element of transconductance, according to the scheme of FIG. 2, which refers to the use of MOS type power devices.

Figure 2:
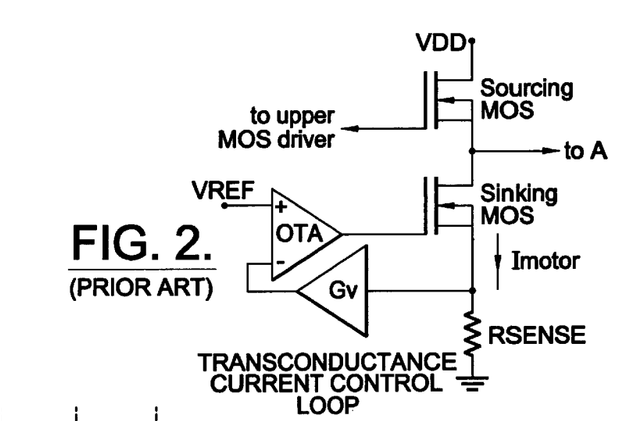
FIG. 2 is a prior art scheme of a transconductance current control loop as described above.

With reference to FIG. 2, the motor current may be expressed as follows:

$$Imotor = \frac{Vref}{Gv*Rs}$$

where Vref is the control voltage supplied by the motor's speed regulation loop, Gv is the voltage gain of the sensing amplifier, while Rs is the current sensing resistor.

Figure 3:
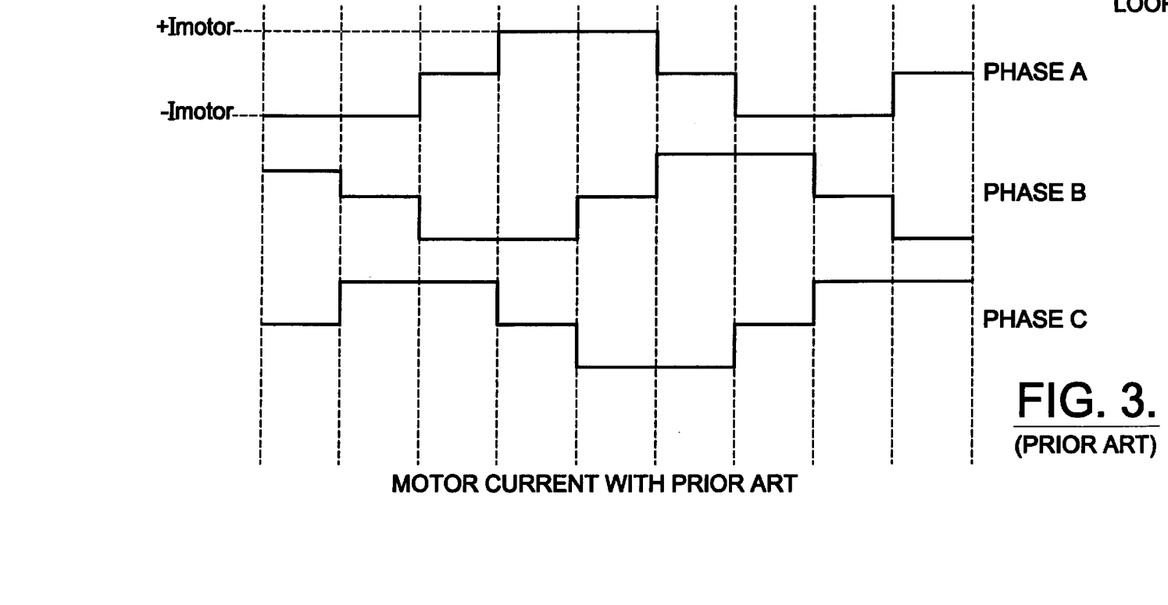
FIG. 3 shows the waveforms of the currents that flow in the three phase windings under control of the respective current regulation loops, according to a known prior art technique.

In the prior art, the voltage Vref is regulated at a certain level by the regulation loop in order to regulate the current absorbed by the motor in maintaining a certain speed. Of course, the regulation loop acts on the Vref value by varying its instantaneous value about a certain mean value to compensate for instantaneous load-torque variations. For this reason, during each excitation phase, the motor current is regulated to a certain level, substantially to a constant level (± Imotor) as shown in the diagram of FIG. 3.

Figure 4A:
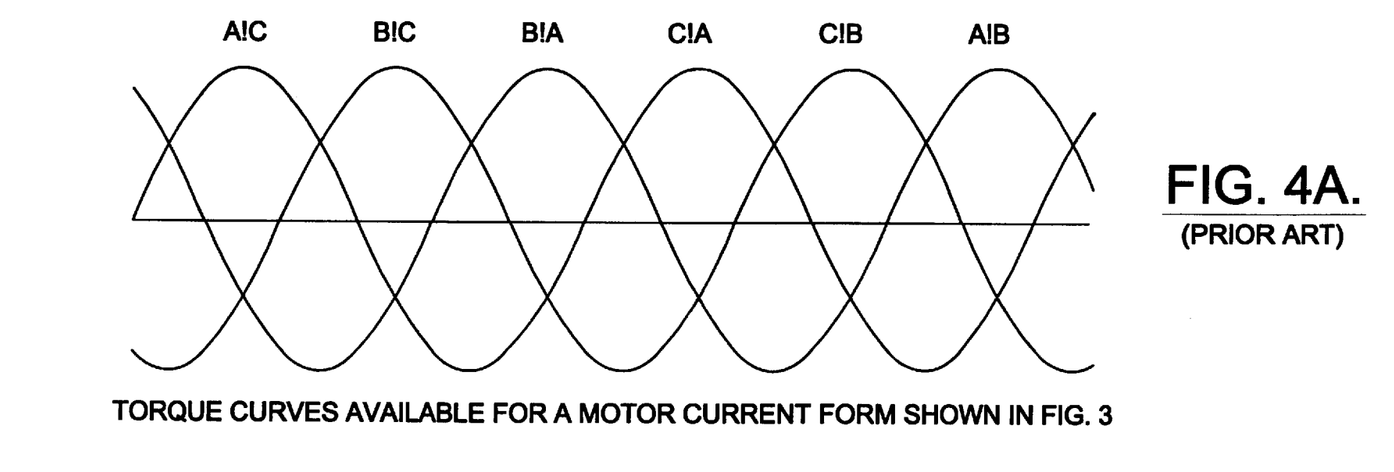
FIG. 4A shows the torque curves relative to the six switching phases of the motor in correspondence with the currents waveforms of FIG. 3 as in the prior art.

FIG. 4A shows the torque curves for a constant Imotor current for the six different excitation phases of the case taken into consideration. By increasing the current, the peak level of the torque curves increases but their form remains substantially unchanged.

Figure 4B:
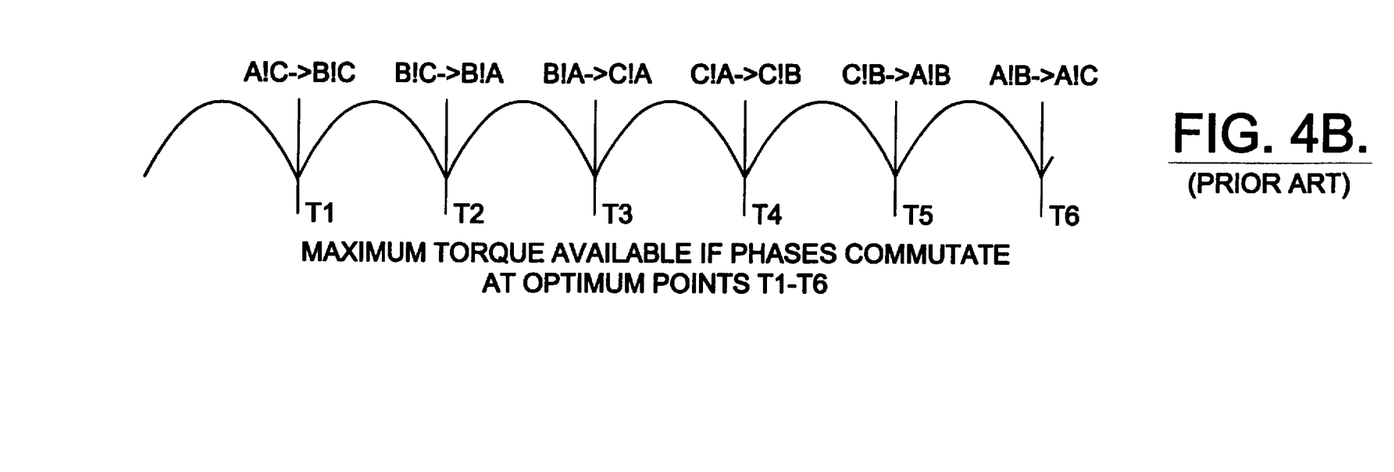
FIG. 4B highlights the torque characteristic of the motor when the phase switchings occur at optimal instants as in the prior art.

FIG. 4B shows the torque characteristics of the motor when the phase switchings take place at the optimal instants, identified as T1, T2, . . . , TG. These optimal switching instants may be determined by using the signals generated by dedicated rotor position sensors, such as, for example, Hall effect cells. Alternately, the rotor position may be monitored by the well known cyclic effect of the generation of back-electromotive-forces (BEMF) in the windings of the motor, sensing the crossing instants of a certain reference level, for example, by the use of zero-crossing comparators.

It is evident from the diagram of FIG. 4B that by forcing a constant current through the motor windings, a torque "ripple" cannot be avoided. In practice, the diagram of FIG. 4B represents the best possible driving condition in this respect, that is where the phase switchings occur at the optimal instants.

SUMMARY OF THE INVENTION

The main objective of the present invention is that of providing a driving technique capable of reducing and minimizing the torque "ripple".

The technique of the invention includes modelling current profiles (as opposed to constant current levels) to be forced through the motor windings during the succession of excitation phases to eliminate or minimize the resulting torque "ripple". According to an aspect of the invention such predefined current profiles are digitized and stored in a nonvolatile memory. The forcing of a current corresponding to the selected profile, through the respective motor winding, occurs by reading the digitized values from the memory synchronously with the instantaneous position.

According to an important embodiment of the invention, the following description refers to a system wherein as many profiles as there are motor windings are stored. This permits independent adaptation of each profile to the relative winding to compensate for any residual torque discrepancy as generated by each excitation phase as may be due to mechanical asymmetries based upon the motor construction. If such a requisite is not desirable, as may be the case in many applications, only one profile need be stored or even just a quarter of the entire period of the required profile may be stored. The full profile and/or out-of-phase identical profiles for the various windings may be reconstructed by symmetry using a dedicated reconstruction logic circuit.

Therefore, according to a fundamental aspect of the invention, the current flowing in each phase winding of the motor is forced therethrough according to a respective profile which is predefined and stored, by substantially synchronizing the scanning of the digitized profile with a timing signal representative of the rotor position. Such a timing signal may be obtained according to any of the known techniques, for example using one or more position sensors, for instance Hall-effect sensors, or a dedicated circuit capable of monitoring and sensing certain significative instants of the cyclic (roughly sinusoidal) evolution of the BEMF signals that are induced on the phase windings of the motor.

Of course the invention assumes that the power stages that force the current through the motor windings are able to produce an output that is a perfect replica of the waveform of a certain driving input signal. The driving signal corresponding to the instantaneous value of one of the predefined and profiles stored in non-volatile memory, as read from the memory (according to a typical current mode driving and controlling scheme).

As evident to a person skilled in the art, the system of the invention will be useful even when there is no need for exerting current control in the final output stage. In this case, reference would not longer be made to current profiles, but rather to voltage profiles which are forced across the two ends of each motor winding (according to a typical voltage mode driving scheme). A voltage-mode driving scheme will presume a knowledge of the ratios VMI/IMI, where VMI is the voltage measured on a winding, and while IMI is the resulting current. Of course, in this case, predefined voltage profiles will be stored in lieu of the current profiles, to produce currents that minimize or eliminate the torque ripple.

In the ensuing description, reference will be made, for simplicity, to current profiles and to a current-mode control taking for granted the above mentioned interchangeability between a driving current profile and a driving voltage profile, and also between a current-mode control and a voltage-mode control.

According to an important embodiment of the present invention, the driving current or voltage profiles, stored in a digital form in the memory, are profiles that can be represented as a sum of Fourier harmonics of a main frequency. The sum of the instantaneous values of the distinct profiles is substantially constant to prevent current recirculation phenomena in the output power stages that drive the motor windings, which recirculation may cause a loss of control of the regulation.

According to an architectural aspect of the invention, each output power stage is driven by the signal output by a digital-to-analog converter (DAC). At the input of the DAC are sequentially applied the digital values corresponding to as many samples of the predefined and digitized current profile, stored generally in a buffer or in a nonvolatile memory, as a function of a certain excitation phase of the motor. For the case where the final stage is substantially represented by the DAC, the analog level corresponding to the digital sample of the current profile is forced directly through the respective winding. Conversely, if a PWM type control is implemented in the final stage, then the architecture of the invention may include a BYTE-to-PWM signal converter that generates a PWM signal from the digital value corresponding to the current profile sample.

In practice, in the case of a three phase motor, that is a motor having three phase windings, three current profiles may be predefined and stored. These current profiles produce through the respective DACs, three analog signals, out of phase by 120°, that drive the three output power stages that force the respective currents through the three windings of the motor, according to a six-phase switching scheme of the motor. The possibility of modelling with a relatively high freedom of choice the profiles of the currents that are forced through the windings of the motor permits eliminating or minimizing any residual "ripple" amplitude of the torque characteristic of the motor.

BRIEF DESCRIPTION OF THE DRAWINGS

The various aspects and advantages of the invention will become even clearer through the following description of some important embodiments and by referring to the attached drawings, wherein.

DETAILED DESCRIPTION OF PREFERRED EMBODIMENTS

The following description of important practical embodiments of the invention only illustrates some ways in which the invention can be produced. The indications given in the following description and in the annexed circuit diagrams are not to be understood in any way as limitative because, as evident to any a person skilled in the art, many of the architecture and circuit choices of the system of the invention may also be devised in a different manner, though functionally equivalent to those described.

One of the main aspects of the invention is that of forcing through the windings of the motor a current whose profile or waveform follows exactly a certain preestablished profile that is stored in a digitized form in a nonvolatile memory, like for example an EPROM or EEPROM memory. The sum of the instantaneous values of the forced currents (that is of the profiles relative to the distinct windings) is constant.

As a consequence, one of the main problems of so driving the motor is that of ensuring a perfect synchronism of the driving process, and in practice of scanning each sequence of stored values along with the instantaneous position of the rotor. In other words, the difficulty is to ensure the production of the maximum torque and in maintaining this synchronism during each phase of operation, that is, during phases of acceleration, revolution at a constant speed and deceleration.

Satisfaction of such a stringent requisite is ensured by a circuit capable of reading from the memory the instantaneous value of the current to be forced through the motor windings, and of effectively forcing such currents through the windings synchronously with a signal representative of the position of the rotor. This signal may be generated by a decoding and processing circuitry of signals generated by dedicated transducers or sensors, for instance by Hall-effect sensors, or by a circuit able to derive an information of the rotor's position by monitoring the BEMFs induced on the motor's windings.

Figure 5:
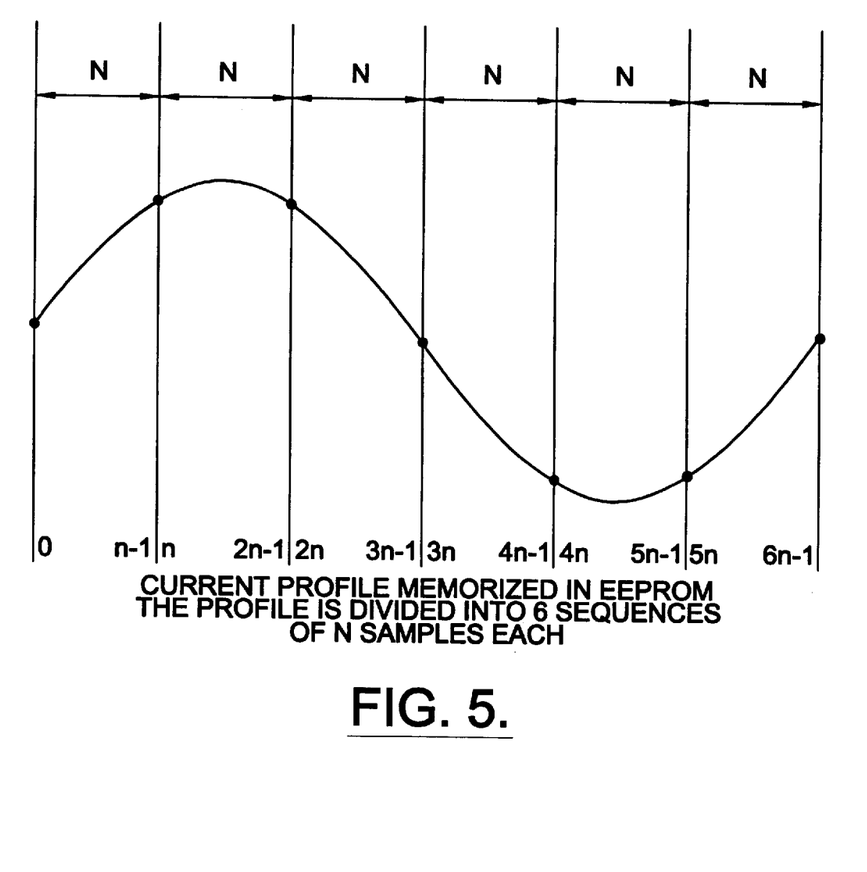
FIG. 5 shows a sinusoidal current profile subdivided into six sequences of N samples each, stored in a nonvolatile memory in accordance with the invention.

The following description considers by way of example, the case of a motor having three phase windings connected in a star configuration, for which a complete switching cycle includes six different excitation phases, and the driving of which be effected according to a current control mode. Therefore, the pre-established waveform profile of the current to be forced through the phase windings of the motor which, by way of exemplification may be chosen to be substantially sinusoidal, as shown in FIG. 5, is subdivided into six portions of equal "duration" in terms of the arc of circumference travelled by the rotor. In other words, the waveform is subdivided into six successive sequences Sx(x=1,6), each composed of a number N of samples. That is to say, each of the six portions into which is subdivided the entire sinusoidal profile is practically sampled in a number N of samples, whose value expressed in digital form, that is, in words of a certain number of bits (for example 8 or more bits), can be stored in a nonvolatile manner in a dedicated register or nonvolatile memory.

The setting of the number N of samples that are stored for each of the sequences into which is subdivided the entire current profile is an important factor. The number N of samples determines the behavior of the other functional blocks that provide the driving system of the invention, as will become evident through the ensuing description.

Figure 6:
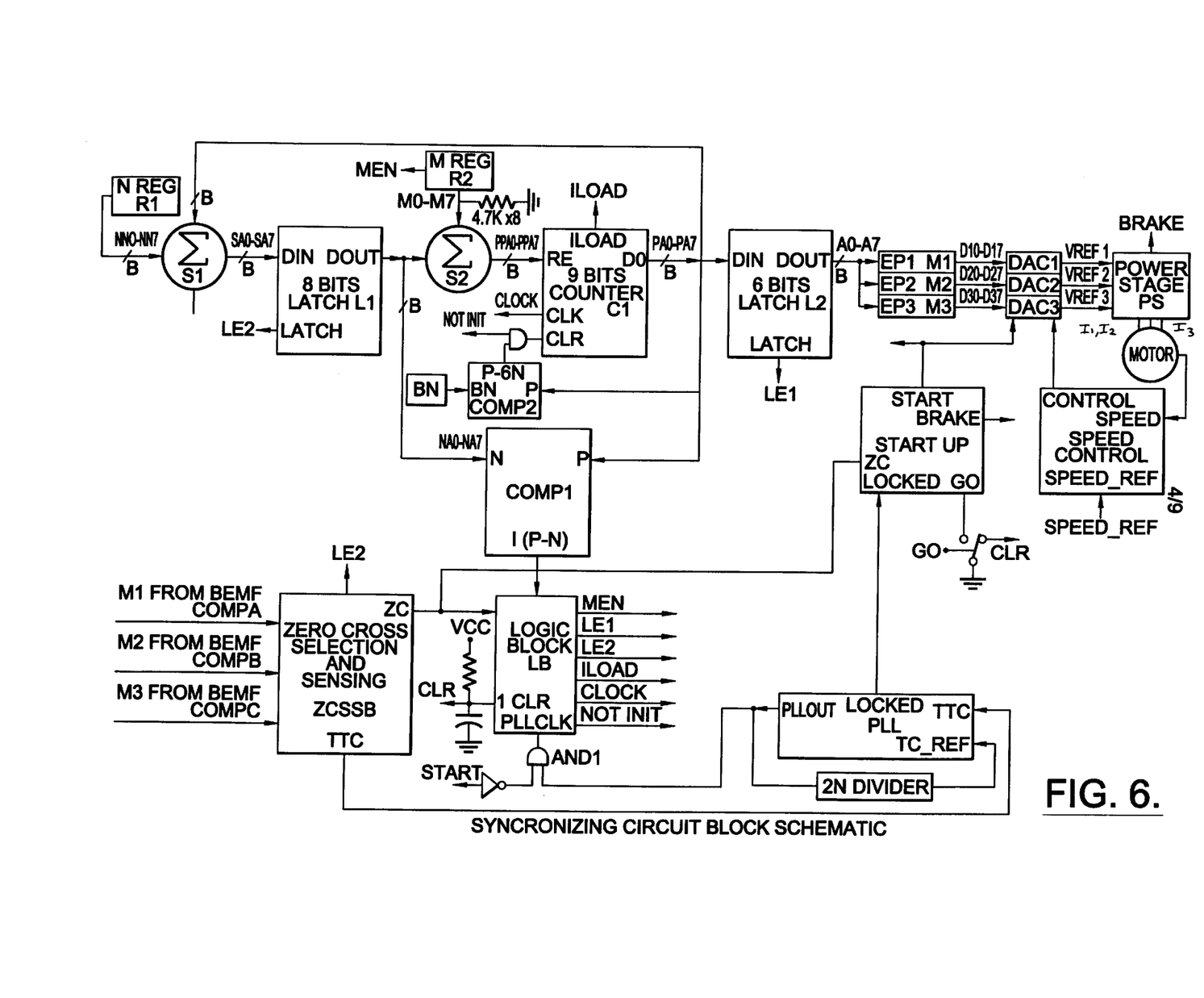
FIG. 6 is a layout of the circuit that synchronizes the reading of each of the six sequences of N samples each into which is subdivided a certain current profile, digitized and stored in a nonvolatile memory, with a signal indicative of the position of the motor's rotor in accordance with the invention.

According to the embodiment of FIG. 6, the ZCSSB block represents a logic circuit capable of sequentially producing a "zero crossing" ZC signal from each of the three analog BEMF signals, induced in the three motor windings by the rotor's rotation or otherwise produced by Hall-effect sensors. The circuit sequentially selects one of the three inputs and, upon recognizing the correct instant, forces the output ZA signal to a high logic state.

Figure 9A:
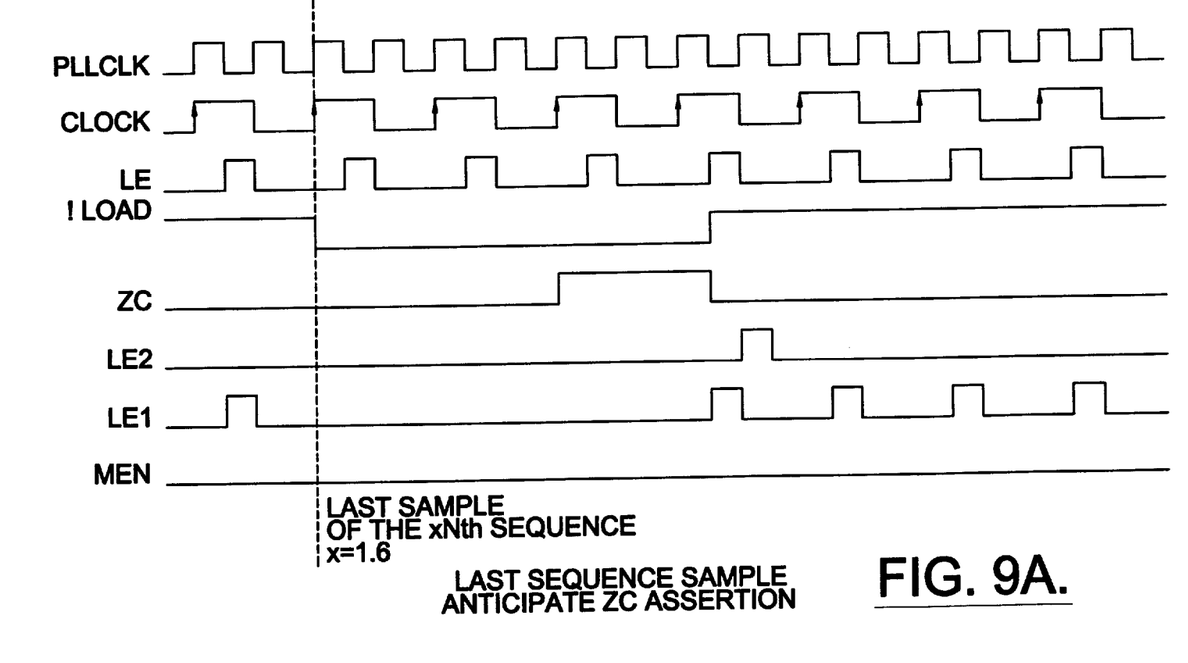
FIGS. 9A and 9B show the input and output signals of the block of FIG. 7 in relation to the two cases of FIGS. 8A and 8B.
Figure 9B:
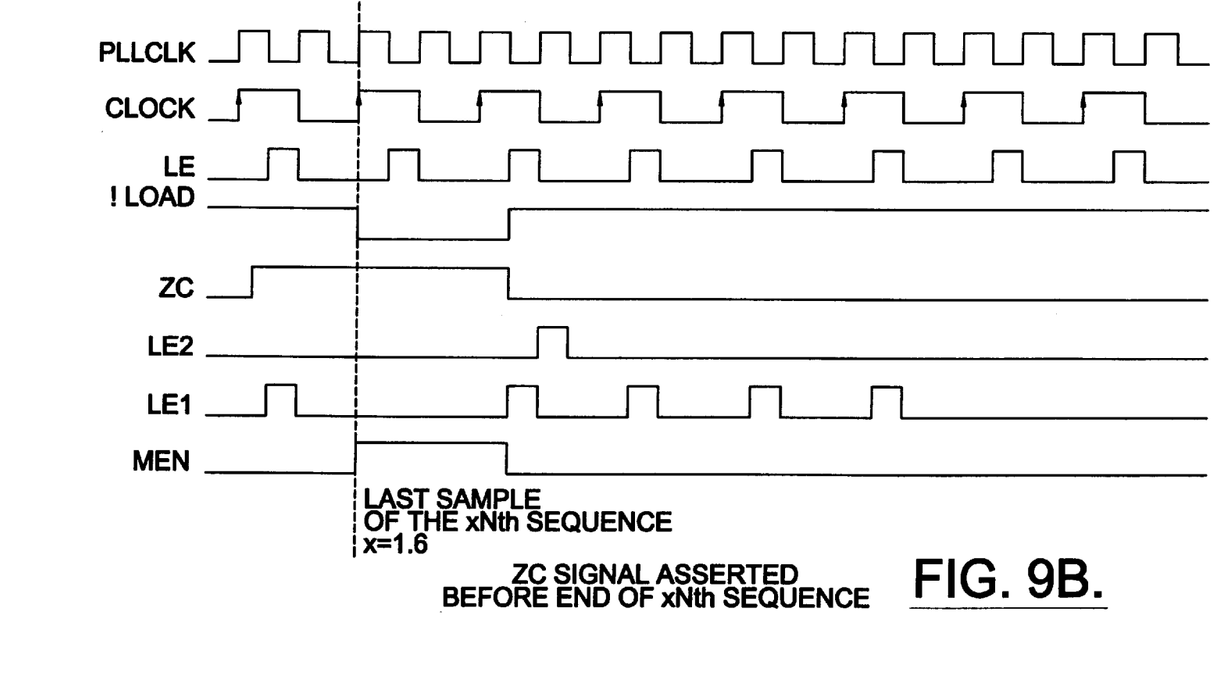

Upon assertion of the ZA signal to a high logic stage, the ZC signal is forced back to a low logic state as described below and as shown in the diagrams of FIGS. 9A and 9B. Tc is the time interval between two successive assertions of the switching to a high state of the ZC signal, and the TTC signal is a signal with the same period of the ZC signal, but with a 50% duty-cycle.

The ZCSSB block may have any of the suitable known architectures that are commonly used in brushless motor for driving systems. For example, the European Patent No. 0 429 412, in the name of the same assignee, discloses a circuit suitable for use in the ZCSSB block of the present system.

Each of the six sequences Sx(x=1,6), of N samples each, that make up each of the three profiles stored in the respective nonvolatile memory buffers, as shown in FIG. 6 by the blocks M1, M2 and M3, must match, on a time base, the last time interval Tc measured. In other words, the system should theoretically have the capacity of ensuring that the time lapsing between the instant of forcing the first sample of the sequence Sx(x=1,6) and the instant of ending the forcing of the last sample of the same sequence, matches the time Tc taken by the scanning of the preceding sequence. By defining as TSAMPLE the forcing time of each sample of a sequence, then N*TSAMPLE=Tc.

By referring to FIG. 5, when the last sample (i.e. the sample 6N-1) of the last sequence is forced, the circuit is reset in a way that the next sample that is going to be forced is again the first sample of the whole stored profile.

An important aspect of the driving system of the invention is that the synchronizing of the scanning of a sequence with the position signal ZC takes place at the end of each sequence. An alternative possibility would be that of resynchronizing the scanning not at the end of each sequence, but rather every K sequences (K=1,6).

Figure 8A:
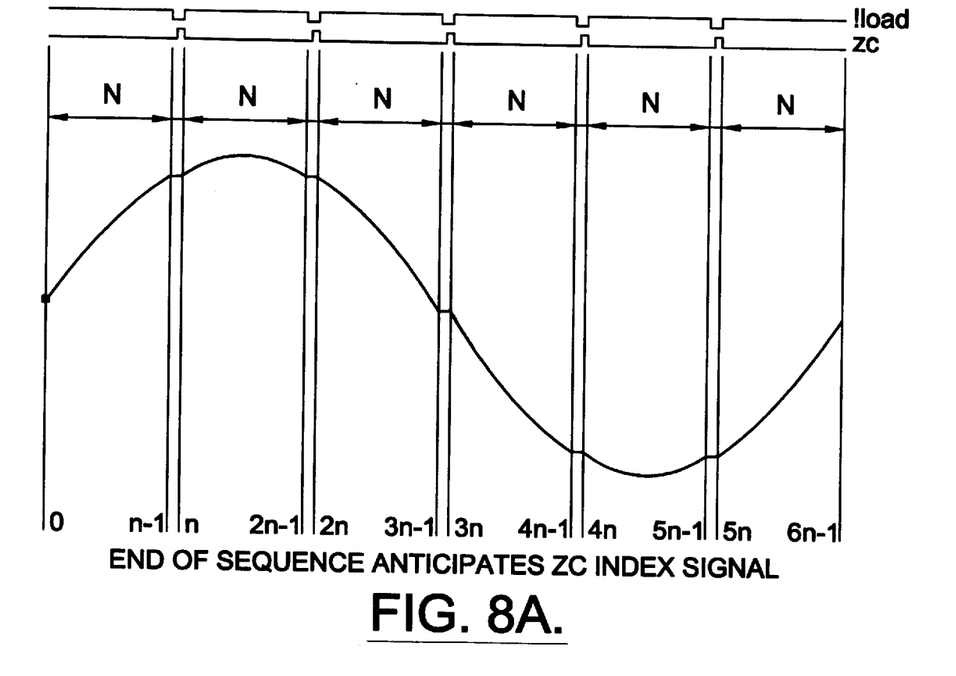
FIGS. 8A and 8B illustrate some significative operation conditions of the system of the invention.

In the ensuing description, it is assumed synchronization is forced at the end of each sequence (K=1). Therefore, when the forcing time of the last sample of each sequence has elapsed, the first sample of the next sequence is forced in synchronism with the ZC signal. Two conditions may occur:

1) According to a first condition, at the end of the forcing time of the last sample of a certain sequence, the ZC signal has not been asserted yet. This means that the relative sequence of N samples (x=1,6) has terminated too early if compared to the optimal switching instant corresponding to the rising front of the new ZC pulse. This condition occurs when the motor decelerates so that the interval Tc between two consecutive switching events must increase, compared to the preceding interval. This condition is schematically represented in FIG. 8A.

In this case the driving system of the invention maintains the same current corresponding to the last sample Sx of the current sequence until a new ZC signal is asserted. When a new rising front occurs and a new ZC pulse is eventually asserted, the circuit is reset by the LB block and the successive sequence S(x+1) of samples is started beginning from its first sample.

Figure 8B:
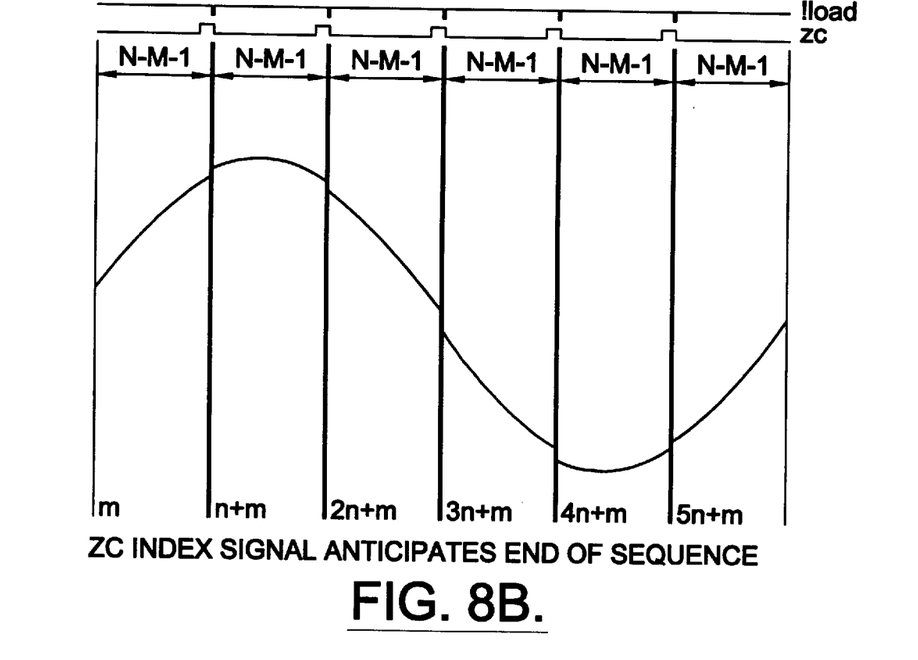

2) According to another operation condition, when the motor is accelerating and the current Tc interval is shorter than the preceding one, the new rising front and eventual assertion of a new ZC pulse occur before all the N samples of the current sequence Sx are "discharged". This situation is represented in the diagram of FIG. 8B.

In this case, the ZC signal is reset to a low logic state by the LB block and the successive sequence of N samples is made to begin not from the first stored sample of the sequence, but rather one or more initial samples of the sequence are skipped so to begin forcing a current in the relative windings of the motor corresponding to a certain $M_{th}$ sample of the new sequence of N samples, where M corresponds to the content of a write/read register. Therefore, the new sequence of N samples will be composed in practice of an N-M number of samples to adapt the driving to a shorter Tc time interval than that last measured, and relative to the last discharged sequence of samples. In this way the system of the invention automatically resynchronizes itself with the instants of assertion of a new ZC pulse.

An alternative embodiment could require that M, instead of identifying the number of samples of the next sequence to be skipped, identifies a percentage of the last determined time interval Tc, and that the corrected time into which effect the scanning of the successive sequence is:

$$\overline{Tc} = TC - \frac{M \cdot Tc}{100}$$

In this case, initial samples are no longer skipped, instead a faster $$(\overline{Tc} < Tc)$$

scanning of the next sequence is performed.

Other embodiments could be based on recognizing that M may be assumed as dependent on the rotation speed of the rotor and on the measured Tc, that is:

$$\overline{Tc} = TC - \frac{M(Tc) \cdot Tc}{100}$$

This because during a quick acceleration M(Tc) must be relatively high to ensure a quick recovery of the sequence duration, whereas, during steady state operation, M(Tc) should be relatively small because the Tc variations to be compensated would be small. A typical M(Tc) characteristic is shown in FIG. 11.

A further possibility may imply that upon the occurrence of a "zero crossing" event in advance, the coming of the current sequence is interrupted and the scanning of the successive sequence is immediately started.

By reference again to the diagram of FIG. 6, each of the three buffers (nonvolatile memories) M1, M2 and M3 contains the 6*N samples that constitute or define the respective entire profile. The three profiles may be stored in the respective registers M1, M2 and M3 so as to be read as if spaced by 120° from each other, and the three buffers M1, M2 and M3 may be addressed in parallel by the A0-A7 signals originating from the LATCH L2. This LATCH L2 provides the row addresses. When the LE1 signal is high, the LATCH L2 is "transparent" and the signals present on the PA0-PA7 lines are transferred to the A0-A7 lines. At power-on, the LE1 signal is forced high for a short period of time, sufficient for the LATCH L2 to set itself in a first configuration (00h) to be forced on the A0-A7 lines.

C1 constitutes the addresses counter. Responsive to each rising front of the CLOCK signal, the address is incremented by a unit. At the end of each of the $Sx_{th}$ sequences (x=1,6), the !LOAD signal is forced low by the LB block to permit a parallel loading of the counter with the data present on the PPA0-PPA7 lines, that is with the first sample of the successive sequence $S(x+1)_{th}$. At power-on, the signal NOTINIT resets the contents of the counter C1, forcing the datum 00h on the PA0-PA7 lines.

The counter C1 is also reset by the comparator COMP2 when the latter recognizes the last sample of the last sequence, that is, when it recognizes the relative datum on the PA0-PA7 lines. Really, the last sample of the last sequence would be 6*N−1 because the first sample of the first sequence is identified by 0.

The comparator COMP1 forces the signal !(P=N) low when the current datum on the PA0-PA7 lines is equal to the datum present on the lines NA0-NA7. In practice, this signal goes low at each last sample of each of the six sequences. The LATCH L1 triggers when the signal LE2 generated by the LB block is high, that is, on occasion of the first sample of a sequence that follows the one just completed.

The adder S1 adds the data present on the NN0-NN7 lines to the data present on the PA0-PA7. The adder S2 adds the data present on the NA0-NA7 lines to the data present on the M0-M7. The data M0-M7 are enabled only when the control signal MEN, produced by the LB block, is high. The circuit block PLL has the task of multiplying by a factor of 2*N the frequency, using as reference signals the TTC signal together with the signal produced by a frequency divider block by a factor 2*N, to which the output signal PLLOUT produced by the block PLL is fed. Thus, the output signal PLLOUT is equivalent to 2*N times the frequency of the TTC signal. In practice, by forcing a new sample of the stored current profile at each assertion of the output signal PLLOUT, a number 2*N of samples will turn out to have been forced within the time interval Tc, being the TTc period equal to Tc.

In the embodiment shown in the figure, the system requires a division by 2*N rather than by N, to implement the necessary signals synchronization in a way that the frequency that really feeds the system of the invention is generated by the LB block and given by: CLOCK =PLLCLK/2 in which PLLCLK is equal to PLLOUT when the START signal is low.

The block PS contains the power stages that drive the three windings of the motor. Each of the three output power stages may be realized with a power MOS or with a bipolar junction transistor and provided with a current control loop circuit, according to any of the known configurations, as for example the one depicted FIG. 2. Each transconductance output stage practically translates the three analog driving signals VREF1, VIREF2 and VREF3, output by the respective digital/analog converters DAC1, DAC2 and DAC3, forcing corresponding currents I1, I2 and I3 through the motor's windings.

The DAC1, DAC2 and DAC3 are three converters that translate into corresponding analog values VREF1, VREF2 and VREF3 the samples, expressed in words of n bits, as read from the respective buffers M1, M2 and M3. The three converters DAC1, DAC2 and DAC3 are controlled by the CONTROL signal supplied by the SPEED CONTROL block that implements a speed regulation loop. The control signal acts upon the input reference level of the three converters. The other control signal START forces the output of the three converters to a predefined starting value as a function of a certain start-up routine of the motor, according to one of the many known techniques that are commonly used.

An external assertion (switching) of the GO command enables the execution of a starting routine of the motor. This routine maintains control of the three converters DAC1, DAC2 and DAC3 by asserting the START signal. During the start-up routine, the motor is accelerated (of course the start-up routine may be defined as a function of the operator requirements) while the PLL block is locking itself. Once locking is attained, the PLL block sends the LOCKED signal to the START UP block that is carrying out the start-up routine. From that moment the START UP block is enabled to switch the system lines Dx0, Dx7 (where x=1,3) to the corresponding inputs of the three DAC1, DAC2 and DAC3 converters.

Figure 10:
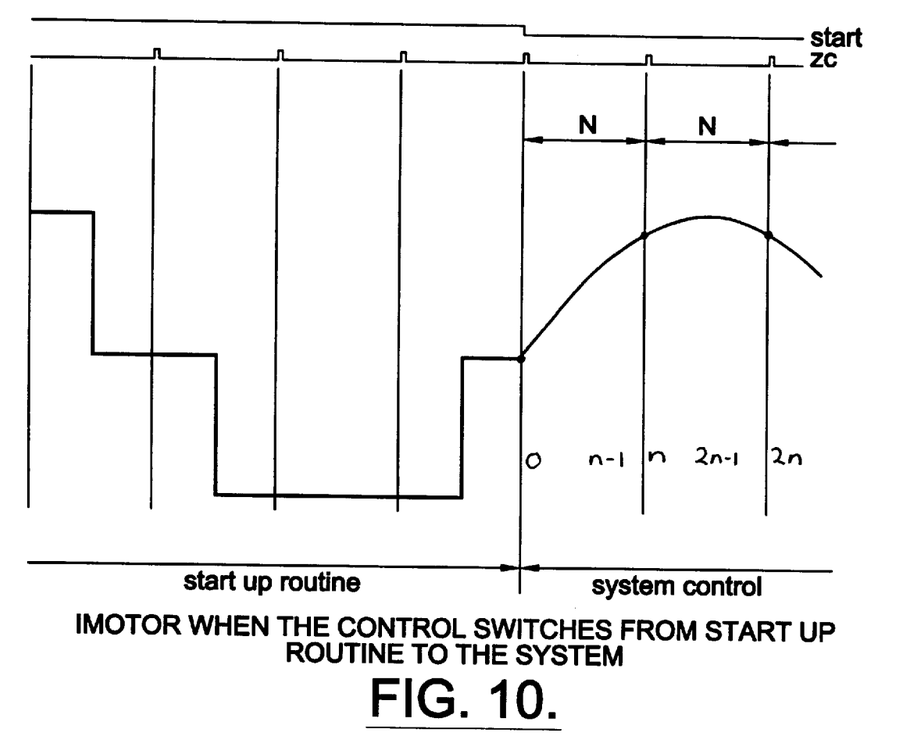
FIG. 10 is a diagram showing the diagram of the current in a motor winding when the control is taken over, at the end of a start-up routine, by the driving system of the invention.

FIG. 10 is a diagram showing the moment in which the circuit that supervises the execution of the start-up routine transfers the control to the DAC1, DAC2 and DAC3 converters. By associating the phase winding A to the DAC1 and VREF1, the phase winding B to the DAC2 and to VREF2 and phase winding C to the DAC3 and VREF3, upon the sensing of the "zero crossing" of the BEMF induced on the winding C, the counter C1 is enabled to count by increments because the LB block begins to output the timing CLOCK signal. This occurs because the START signal goes low thus making AND1 transparent so that the PLLCLK signal is equal to the PLLOUT signal.

When the PA0-PA7 lines reach the decimal value N, the comparator COMP1 forces the signal !(P=N) low. The LB block forces the signal !LOAD low, which allows, at the successive rising front of the CLOCK signal, the loading in the counter C1 of the data currently present on the PPA0-PPA7 lines.

In the case where the motor is braking when the signal !LOAD goes low, the ZC signal will not yet be asserted, as shown in the diagram of FIG. 9A. In this case, the signal MEN remains low and the decimal value N is down-loaded in the counter C1.

When the motor is accelerating, in the precise moment in which the signal !LOAD goes low, the signal ZC is already high, as highlighted in the diagram of FIG. 9B. In this case, the signal MEN is asserted by the LB Block and the decimal value N+M is down-loaded into the counter C1. During the time in which the signal !LOAD is low, the signal LE1 is forced low so that the converters DAC1, DAC2 and DAC3 are not updated.

In both cases, upon the assertion of the ZC signal, the signal !LOAD is set by the successive pulse LE which is internally generated and used by the LB block. When !LOAD is asserted, the LE1 signal tracks the LE signal, allowing the updating of the DAC1, DAC2 and DAC3 converters.

Finally, the signal LE2 is also forced high at first and then forced low, to store in LATCH L1 the first value of the new sequence of samples that will be 2N or 2N+M (according to what has already been described above in relation to the diagrams of FIGS. 8A and 8B). This situation repeats itself until the last sample is transferred onto the PA0-PA7 lines. At this point, the comparator COMP2 resets the system to the first sample of the first sequence of samples.

The LB block generates all synchronization and control signals required by the system, according to the functions described above.

Figure 7:
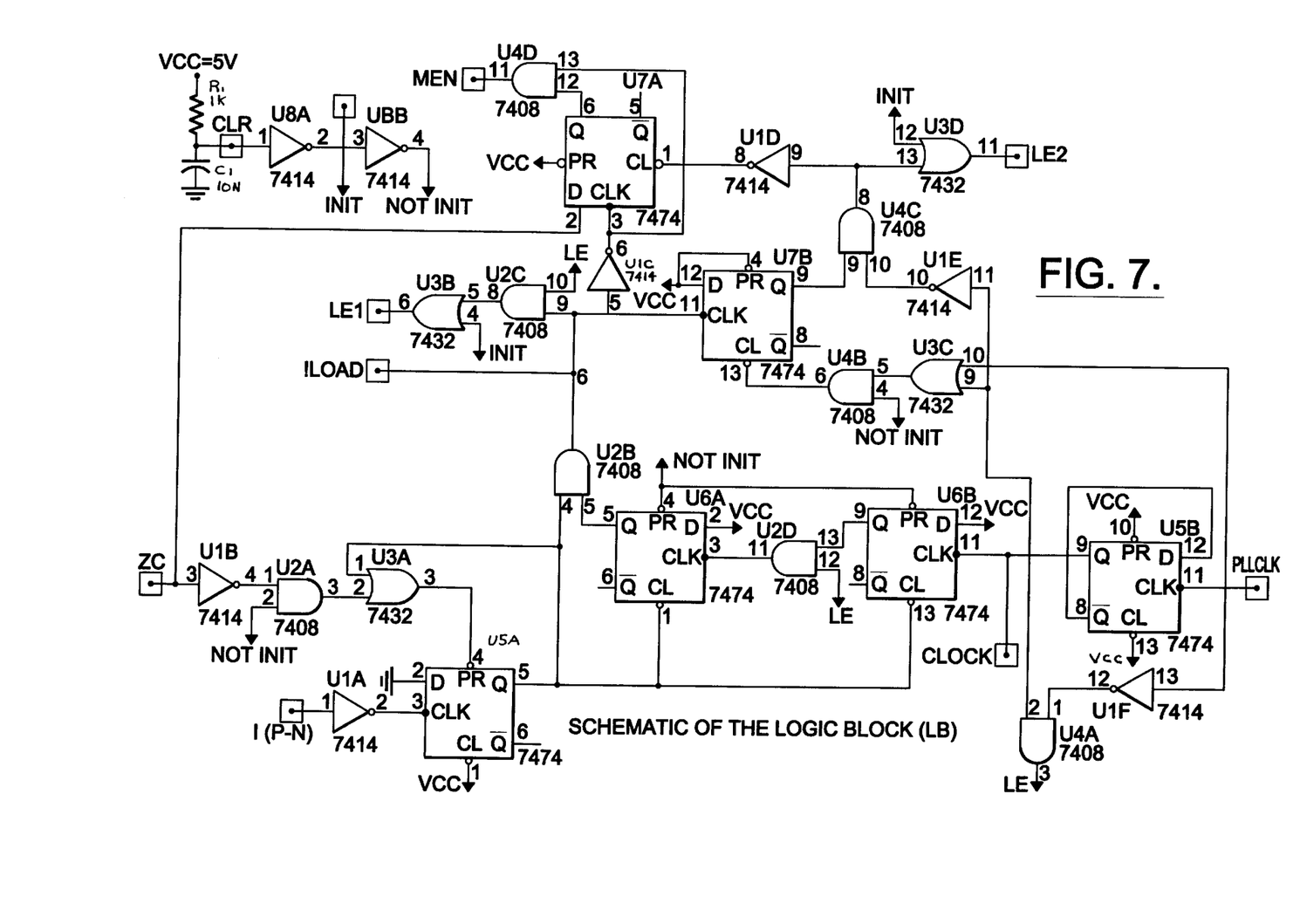
FIG. 7 is a detailed circuit diagram of the block that generates the synchronization signals of the diagram of FIG. 6.

A viable circuit embodiment of the LB block is shown in FIG. 7, using a standard notation as would be appreciated by one of ordinary skill in the art. Of course, the necessary synchronization and control signals of the system could also be generated by using a circuit or logic circuits equivalent to those illustrated, by way of example, in FIG. 7.

I claim:

1. A method of driving a polyphase brushless motor comprising the steps of:

defining and storing in a nonvolatile memory a current or voltage profile for each phase winding of the motor by subdividing each profile into a number of sequences equivalent to a number of switching phases of the motor, wherein each sequence comprising N samples, and each sample sequence being stored and read from the memory in the form of digital words of a certain number of bits, so that the sum of the instantaneous values of the profiles is constant; and forcing a current in conformity with the stored profiles, read from the nonvolatile memory, through the respective phase winding of the motor, in synchronism with a synchronization signal representative of the rotor position, while also converting the sample value read from the non-volatile memory into an analog signal while also controlling the amplitude of the converted analog signal through a speed regulation loop.

2. The method according to claim 1, wherein the step of defining and storing the profiles comprises defining and storing the profiles to correspond to a sum of Fourier harmonics of a main frequency.

3. The method according to claim 1, further comprising the step of scanning each sequence of N samples in a time Tc that corresponds to a time interval between a prior two preceding assertions of the synchronization signal representative of the rotor position.

4. The method according to claim 1, wherein the step of forcing a current comprises asserting the synchronization signal representative of the rotor position in coincidence with respective optimal phase switching positions assumed by the rotor under any operating condition.

5. The method according to claim 4, wherein during an acceleration phase of the motor, the number of samples utilized by any of the sequences of N samples is proportionally decreased by M samples by skipping the first M samples of the sequence responsive to assertion of a new synchronization signal upon passage of the rotor through a phase switching position occurring before completion of a preceding sequence of samples.

6. The method according to claim 4, wherein during an acceleration phase of the motor, the scanning of a next sequence takes place in a time Tc obtained from a measured scanning time Tc of a preceding sequence, minus a percentage M% thereof, where M is a programmable content of a register.

7. The method according to claim 4, wherein during an acceleration phase of the motor, the scanning of the next sequence takes place in a time Tc obtained from a measured scanning time Tc of a preceding sequence, minus a percentage M% thereof, where M is a function of the scanning time Tc of the last sequence.

8. The method according to claim 4, wherein during an acceleration phase of the motor, the scanning of an ongoing sequence is interrupted responsive to an assertion of the synchronization signal giving immediate start to the scanning of a successive sequence.

9. The method according to claim 4, wherein during a deceleration phase of the motor, current is maintained through the phase windings of the motor, at a constant level corresponding to the last sample of the respective profiles until the occurrence of a new synchronization signal that signifies the crossing by the rotor of a phase switching position.

10. The method according to claim 1, wherein the step of defining and storing each profile comprises defining and storing each profile having a period corresponding to a complete electric revolution of the rotor.

11. A driving system for a polyphase brushless motor of a type comprising a rotor and a plurality of phase windings, the driving system comprising:

a plurality of output power stages driving as many phase windings of the motor;

nonvolatile memory means for storing preset driving current profiles for each phase winding;

a plurality of digital-to-analog or n-bits-to-pulse width modulation (PWM) converters for converting a digital value of each sample of respective stored current profile into a driving analog signal for the relative power stage;

logic means for synchronizing the conversions with a synchronization logic signal representative of a position of the rotor, and a speed regulation loop for controlling the amplitude of a converted analog signal.

12. The driving system according to claim 11, further comprising means for defining and storing the profiles to correspond to a sum of Fourier harmonics of a main frequency.

13. The driving system according to claim 11, further comprising means for subdividing each profile into a number of sequences equivalent to a number of switching phases of the motor so that each sequence comprises N samples and so that each sample sequence is stored and read from said nonvolatile memory means in the form of digital words of a certain number of bits.

14. The driving system according to claim 13, further comprising means for scanning each sequence of N samples in a time Tc that corresponds to a time interval between a prior two preceding assertions of the synchronization signal representative of the rotor position.

15. The driving system according to claim 13, further comprising means for asserting the synchronization signal representative of the rotor position in coincidence with respective optimal phase switching positions assumed by the rotor under any operating condition.

16. The driving system according to claim 15, further comprising means for proportionally decreasing by M samples the number of samples utilized by any of the sequences of N samples by skipping the first M samples of the sequence responsive to assertion of a new synchronization signal upon passage of the rotor through a phase switching position occurring before completion of a preceding sequence of samples and during an acceleration phase of the motor.

17. The driving system according to claim 15, further comprising means for scanning of a next sequence taking place in a time Tc obtained from a measured scanning time Tc of a preceding sequence, minus a percentage M% thereof, where M is a programmable content of a register, and during an acceleration phase of the motor.

18. The driving system according to claim 15, further comprising means for scanning of a next sequence taking place in a time Tc obtained from a measured scanning time Tc of a preceding sequence, minus a percentage M% thereof, where M is a function of the scanning time Tc of the last sequence, and during an acceleration phase of the motor.

19. The driving system according to claim 15, further comprising means for interrupting a scanning of an ongoing sequence responsive to an assertion of the synchronization signal giving immediate start to the scanning of a successive sequence and during an acceleration phase of the motor.

20. The driving system according to claim 19, further comprising means for maintaining current through the phase windings of the motor, at a constant level corresponding to the last sample of the respective profiles until the occurrence of a new synchronization signal that signifies the crossing by the rotor of a phase switching position and during a deceleration phase of the motor.

21. The driving system according to claim 11, further comprising means for defining and storing each profile having a period corresponding to a complete electric revolution of the rotor.

* * * * *

UNITED STATES PATENT AND TRADEMARK OFFICE
CERTIFICATE OF CORRECTION

PATENT NO. : 5,844,388
DATED : December 1, 1998
INVENTOR(S) : Maiocchi

It is certified that error appears in the above-identified patent and that said Letters Patent is hereby corrected as shown below:

On the title page, item

[75] Inventor:
Strike:
"Giuseppe Maiocchi, Villa Gaurdia, Italy"

Insert:
-- Giuseppe Maiocchi, Villa Guardia, Italy --

Column 4, lines 34-35:
Strike:
"invention; and"

Insert:
-- invention. --

Column 4, line 44:
Strike:
"evident to any a person skilled in the art, many of the"

Insert"
-- evident to any person skilled in the art, many of the --

UNITED STATES PATENT AND TRADEMARK OFFICE
CERTIFICATE OF CORRECTION

PATENT NO. : 5,844,388
DATED : December 1, 1998
INVENTOR(S) : Maiocchi

It is certified that error appears in the above-identified patent and that said Letters Patent is hereby corrected as shown below:

Column 7, lines 12-13: Strike:
"A typical M(Tc) characteristic is shown in FIG. 11."

Column 9, line 30: Strike:
"I claim:"

Insert:
-- Claims --

Signed and Sealed this

Sixth Day of April, 1999

Attest:

Attesting Officer

Q. TODD DICKINSON

Acting Commissioner of Patents and Trademarks